United States Patent

Jagawa et al.

Patent Number: 5,811,491
Date of Patent: Sep. 22, 1998

[54] GLASS FIBER-REINFORCED THERMOPLASTIC RESIN COMPOSITION

[75] Inventors: Yasutoshi Jagawa, Aichi; Takeyoshi Nishio, Okazaki; Kiyoshi Ogura, Takatsuki; Mikio Hirai, Niihama, all of Japan

[73] Assignees: Sumitomo Dow Limited, Osaka; Toyota Jidosha Kabushiki Kaisha, Aichi, both of Japan

[21] Appl. No.: 468,625

[22] Filed: Jun. 6, 1995

Related U.S. Application Data

[63] Continuation of Ser. No. 150,124, Nov. 29, 1993, abandoned.

[30] Foreign Application Priority Data

| Mar. 31, 1992 | [JP] | Japan | 4-108967 |
| Aug. 31, 1992 | [JP] | Japan | 4-257246 |
| Oct. 13, 1992 | [JP] | Japan | 4-301796 |
| Oct. 13, 1992 | [JP] | Japan | 4-301797 |
| Mar. 12, 1993 | [JP] | Japan | 5-078734 |

[51] Int. Cl.$^6$ ............................. C08L 51/04
[52] U.S. Cl. ............... 525/71; 525/73; 525/86; 524/494; 524/504
[58] Field of Search .................. 525/71, 73, 86; 524/494, 504

[56] References Cited

U.S. PATENT DOCUMENTS

| 4,567,233 | 1/1986 | Tomono et al. | 525/71 |
| 4,877,833 | 10/1989 | Kondo et al. | 525/71 |
| 4,879,343 | 11/1989 | Aoki et al. | 525/71 |
| 5,039,719 | 8/1991 | Watanabe et al. | 525/74 |

*Primary Examiner*—Mark L. Warzel

[57] ABSTRACT

A glass fiber-reinforced thermoplastic resin excellent in providing a balance between processability, tapping strength and heat resistance. The composition comprising (A) 10 to 60% by weight of a terpolymer which comprises N-phenylmaleimide, styrene and acrylonitrile, (B) 5 to 20% by weight of a graft polymer which comprises at least one rubber selected from the group consisting of a conjugated diene rubber, an ethylene-propylene rubber and an ethylene-butylene rubber comprising ethylene and butylene, to which rubber styrene and acrylonitrile are graft polymerized, (C) 10 to 80% by weight of a copolymer which comprises styrene and acrylonitrile, and (D) 5 to 35% by weight of glass fiber, wherein (a) the terpolymer has an intrinsic viscosity of 0.20 dl/g to 0.70 dl/g, (b) the copolymer has an intrinsic viscosity of 0.40 dl/g to 1.00 dl/g, (c) the intrinsic viscosity of terpolymer is equal to or smaller than that of the copolymer, and (d) a styrene content in the copolymer minus a styrene content in the terpolymer is from +20 to −5% by weight.

15 Claims, 2 Drawing Sheets

GLASS FIBER-REINFORCED THERMOPLASTIC RESIN COMPOSITION

This application is a continuation of application Ser. No. 08/150,124, filed Nov. 29, 1993 now abandoned; which is a 371 of PCT/JP93/00392 filed Mar. 30, 1993.

FIELD OF THE INVENTION

The present invention relates to a glass fiber-reinforced thermoplastic resin composition which is excellent in balance between processability and tapping strength, and heat resistance. In particular, the present invention relates to a glass fiber-reinforced thermoplastic resin composition comprising a terpolymer and a copolymer which have a specific relationship and a graft polymer, in which glass fiber is blended.

PRIOR ART

A rubber-modified styrene base resin such as ABS resin (an acrylonitrile-butadiene rubber-styrene polymer) and AES resin (an acrylonitrile-ethylene/propylene rubber-styrene polymer) is excellent in balance between moldability and impact strength and also appearance of a molded article, and widely used as a material of automobile parts, electrical equipment, business and office machines. With in the fields application, a resin having better heat resistance and modulus is desired. In particular, in the case of a material of an instrument panel or a roller bearing of a copying machine, better heat resistance and modulus are required.

To this end, a glass fiber-reinforced resin composition comprising a rubber-modified styrene base resin, a maleic anhydride base copolymer and glass fiber, or a rubber-modified styrene base resin, an N-phenylmaleimide base copolymer and glass fiber is proposed.

However, the conventional glass fiber-reinforced resin composition suffers from a decrease in processability and impact strength, while heat resistance and stiffness are improved. In particular, the tapping strength is greatly decreased, and failure strength of a boss is decreased to about half of that of the general glass fiber-reinforced styrene base resin composition. Accordingly, when a screw driver exerting the same clamping force is used, the boss is broken when an article is assembled. Then, the improvement of tapping strength has been desired.

Because of the presence of glass fiber, the appearance, namely the surface smoothness, of the resin composition is deteriorated. Therefore, the coating thickness should be increased when the article is coated. In addition, since a specific gravity of the composition is increased, the compounding of glass fiber is a great barrier to weight reduction of a product.

SUMMARY OF THE INVENTION

As a result of extensive study of the above problems, it has been found that, when compositions and structures of an N-phenylmaleimide terpolymer and a styrene-acrylonitrile copolymer are specified, the heat resistance and modulus of the glass fiber-reinforced rubber-modified styrene base resin composition can be improved and a composition having excellent balance between heat resistance and tapping strength is obtained. It has also been found that by compounding a specific compound or polymer, impact resistance, tensile strength and processability of the resin composition are increased, and also anisotropy of a mold shrinkage factor and appearance (surface smoothness) are improved.

The present invention provides a glass fiber-reinforced thermoplastic resin composition with good balance between processability and tapping strength, and good heat resistance, comprising:

(A) 10 to 60% by weight of a terpolymer which comprises 10 to 30% by weight of N-phenylmaleimide, 45 to 85% by weight of styrene and 5 to 25% by weight of acrylonitrile, (B) 5 to 20% by weight of a graft polymer which comprises 20 to 70% by weight of at least one rubber selected from the group consisting of a conjugated diene rubber, an ethylene-propylene rubber and an ethylene-butylene rubber comprising 70 to 95% by weight of ethylene and 5 to 30% by weight of butylene, to which rubber 25 to 60% by weight of styrene and 5 to 40% by weight of acrylonitrile are graft polymerized, (C) 10 to 80% by weight of a copolymer which comprises 50 to 80% by weight of styrene and 20 to 50% by weight of acrylonitrile, and (D) 5 to 35% by weight of glass fiber, wherein (a) said terpolymer has an intrinsic viscosity of 0.20 to 0.70 dl/g, (b) the copolymer has an intrinsic viscosity of 0.40 to 1.00 dl/g, (c) the intrinsic viscosity of the terpolymer is equal to or smaller than that of the copolymer, and (d) a difference of a styrene content in the copolymer and that in the terpolymer (a styrene content in the copolymer–(minus) a styrene content in the terpolymer) is from +20 to % by weight.

The present invention further provides a glass fiber-reinforced thermoplastic resin composition with improved impact resistance comprising the above composition and an organic silicon compound; a glass fiber-reinforced thermoplastic resin composition with improved tensile strength comprising the above composition and an acid-modified copolymer; a glass fiber-reinforced thermoplastic resin composition with improved anisotropy of a mold shrinkage factor comprising the above composition and an ethylene-butylene rubber; a glass fiber-reinforced thermoplastic resin composition with improved processability comprising the above composition and a hydrogenated styrene-butadiene block rubber; and a glass fiber-reinforced thermoplastic resin composition with improved appearance (surface smoothness) comprising the above composition and a graft polymer which comprises an ethylene-olefin rubber to which styrene and acrylonitrile are grafted.

DETAILED DESCRIPTION OF THE INVENTION

The glass fiber-reinforced thermoplastic resin composition of the present invention will be explained in detail.

TERPOLYMER

The terpolymer (A) is one prepared by polymerizing 10 to 30% by weight of N-phenylmaleimide, 45 to 85% by weight of styrene and 5 to 25% by weight of acrylonitrile.

When the content of N-phenylmaleimide is less than 10% by weight, heat resistance deteriorated; while when it exceeds 30% by weight, processability deteriorates. When the content of styrene is less than 45% by weight, processability deteriorates, while when it exceeds 85% by weight, heat resistance deteriorates. When the content of acrylonitrile is less than 5% by weight, tapping strength deteriorates, while when it exceeds 25% by weight, processability deteriorates.

Preferably, the terpolymer comprises 20 to 30% by weight of N-phenylmaleimide, 60 to 70% by weight of styrene and 10 to 20% by weight of acrylonitrile.

The terpolymer (A) may be prepared by any one of the known polymerization processes such as emulsion polymerization, bulk polymerization, suspension polymerization, solution polymerization, and their combination.

The order and manner of the addition of the compounds to a reaction system are not limited, and any suitable order and manner of the addition (simultaneous, continuous or portion wise addition) may be employed.

In addition to the composition of the terpolymer (A), its intrinsic viscosity (measured at 30° C. in dimethylformamide) is also important (the condition (a)), and its range is from 0.20 to 0.70 dl/g.

When the intrinsic viscosity is less than 0.20 dl/g, the tapping strength and impact resistance deteriorate, while when it is larger than 0.70 dl/g, processability deteriorates. Preferably, the intrinsic viscosity is from 0.30 to 0.40 dl/g.

The intrinsic viscosity can be adjusted by controlling the polymerization conditions. For example, the terpolymer having the desired intrinsic viscosity can be prepared by changing the polymerization composition, the polymerization temperature, and the kinds and amounts of the polymerization initiator and the molecular weight modifier.

GRAFT POLYMER

The graft polymer (B) is one prepared by graft polymerizing 25 to 60% by weight of styrene and 5 to 40% by weight of acrylonitrile on 20 to 70% by weight of at least one rubber selected from the group consisting of a conjugated diene rubber, an ethylene-propylene rubber and an ethylene-butylene rubber comprising 70 to 95% by weight of ethylene and 5 to 30% by weight of butylene.

Examples of the conjugated diene rubber which constitutes the graft polymer (B) are polybutadiene, butadiene-styrene rubber, butadiene-acrylonitrile rubber and the like. These conjugated diene rubbers can be prepared by emulsion polymerization, solution polymerization, suspension polymerization, bulk polymerization, and so on.

Examples of the ethylene-propylene rubber are ethylene-propylene copolymers, ethylene-propylene-non-conjugated diene copolymers comprising a non-conjugated diene compound such as dicyclopentadiene, ethylidenenorbornene, 1,4-hexadiene, 1,4-cycloheptadiene, 1,5-cyclooctadiene and the like.

These ethylene-propylene rubbers can be prepared by solution polymerization, and so on.

Preferably, a molar ratio of ethylene to propylene in the ethylene-propylene rubber is from 5:1 to 1:3. In the ethylene-propylene-non-conjugated diene copolymer, the content of the non-conjugated diene is preferably from 2 to 50 in terms of an iodine value.

The ethylene-butylene rubber is one comprising 70 to 95% by weight of ethylene and 30 to 5% by weight of butylene, and preferably an amorphous or low-crystalline rubber comprising 80 to 95% by weight of ethylene and 20 to 5% by weight of butylene.

These ethylene-butylene rubbers can be prepared by solution polymerization (the Ziegler process), and so on.

Molecular weight is not critical. Preferably, a melt flow rate (MFR) (according to ASTM D-1238 at 230° C.) is from 0.1 to 100 g/10 min.

When the content of rubber is less than 20% by weight, impact strength deteriorates, while when it exceeds 70% by weight, appearance and anisotropy deteriorate. When the content of styrene is less than 25% by weight, appearance and anisotropy deteriorate, while when it exceeds 60% by weight, impact resistance and appearance deteriorate. When content of acrylonitrile is less than 5% by weight, appearance and anisotropy deteriorate, while when it exceeds 40% by weight, resistance to thermal decomposition deteriorate.

Preferably, the graft copolymer comprises 30 to 60% by weight of the rubber, 30 to 55% by weight of styrene and 10 to 30% by weight of acrylonitrile.

A structure of the graft polymer (B) is not limited. Preferably, a graft ratio is from 20 to 100%, and a weight average particle size is from 0.05 to 5 $\mu$m.

The graft polymer may be prepared by any one of the known polymerization processes such as emulsion polymerization, suspension polymerization, solution polymerization, bulk polymerization, and their combination. In general, styrene and acrylonitrile are polymerized in the presence of the rubber. There is no limitation on the manner of addition of styrene and acrylonitrile. Any arbitrary order and manner of addition (simultaneous, continuous or portion wise addition) may be employed.

COPOLYMER

The copolymer (C) is one comprising 50 to 80% by weight of styrene and 20 to 50% by weight of acrylonitrile.

When the content of styrene is less than 50% by weight, that is, when a content of acrylonitrile exceeds 50% by weight, processability deteriorates. When the content of styrene exceeds 80% by weight, that is, when the content of acrylonitrile is less than 20% by weight, heat resistance deteriorates.

Preferably, the copolymer comprises 60 to 75% by weight of styrene and 25 to 40% by weight of acrylonitrile.

The copolymer (C) can be prepared by any one of the known polymerization processes such as emulsion polymerization, bulk polymerization, suspension polymerization, solution polymerization, and their combination.

The order and manner of the addition of these compounds to a reaction system are not limited, and any suitable order and manner of the addition (simultaneous, continuous or portion wise addition) may be employed.

As in the case of the terpolymer, in addition to the composition of the copolymer (C), its intrinsic viscosity (measured at 30° C. in dimethylformamide) is also important (the condition (b)), and its range is from 0.40 to 1.00 dl/g. When the rubber constituting the graft polymer (B) is diene rubber, preferably the copolymer (C) has the intrinsic viscosity of 0.40 to 0.80 dl/g.

When the intrinsic viscosity is less than 0.40 dl/g, tapping strength and impact resistance deteriorate, while when it is larger than 1.00 dl/g, processability deteriorates. Preferably, the intrinsic viscosity is from 0.50 to 0.70 dl/g.

The intrinsic viscosity can be adjusted by controlling the polymerization conditions. For example, the copolymer having the desired intrinsic viscosity can be prepared by changing the polymerization composition, the polymerization temperature, and the kinds and amounts of the polymerization initiator and the molecular weight modifier.

GLASS FIBER

As the glass fiber, there may be used not only a monofilament but also a fiber, the surface of which is treated with an organic chromic acid compound (e.g. methacrylate chromic chloride, etc.) or an organic silane compound (e.g. vinyltriethoxysilane, γ-glycidoxypropyltrimethoxysilane, β-(3,4-epoxycyclohexyl)-ethyltrimethoxysilane, etc.); fibers prepared by treating the surface treated fibers or untreated fibers with a known binding agent (e.g. vinyl acetate resin, urethane resin, epoxy resin, polyester resin, etc.); and glass fibers coated with at least one polymer of the above polymers (A), (B) and (C).

The fiber length and diameter of the glass fiber are not critical and arbitrarily selected. Preferably, the fiber length is from 3 to 10 mm, and the fiber diameter is from 3 to 100 μm in view of property balance, in particular, the modulus, tapping strength and processability of the final composition.

The first composition of the present invention comprises the above polymers (A), (B) and (C) and the glass fiber (D), and their ratio, namely their composition are 10 to 60% by weight of the terpolymer (A), 5 to 20% by weight of the graft polymer (B), 10 to 80% by weight of the copolymer (C) and 5 to 35% by weight of the glass fiber (D).

When the content of the terpolymer is less than 10% by weight, heat resistance deteriorates, while when it exceeds 60% by weight, processability deteriorates. When the content of the copolymer is less than 10% by weight, processability deteriorates, while when it exceeds 80% by weight, impact resistance and heat resistance are deteriorate.

Further, when the content of the glass fiber is less than 5% by weight, the modulus deteriorates, while when it exceeds 35% by weight, processability deteriorates.

Preferably, the first composition comprises 20 to 40% by weight of the terpolymer (A), 5 to 15% by weight of the graft polymer (B), 25 to 60% by weight of the copolymer and 10 to 15% by weight of the glass fiber.

In the composition of the present invention, in addition to the above contents of the components and the conditions (a) and (b), it is important that the intrinsic viscosity of terpolymer (A) is equal to or smaller than that of the copolymer (C) (the intrinsic viscosity of terpolymer (A)≦the intrinsic viscosity of copolymer (C)) (the condition (c)), and the styrene content in the copolymer (C) is not larger than that in the terpolymer (A) by exceeding 20% by weight and the former is not smaller than the latter by exceeding 5% by weight (the styrene content in the copolymer (C)–(minus) the styrene content in the terpolymer (A)=+20 to –5% by weight) (the condition (d)).

When the intrinsic viscosity of terpolymer is larger than that of the copolymer, the tapping strength and the impact resistance deteriorate. A combination of the terpolymer having the intrinsic viscosity of 0.30 to 0.40 dl/g and the copolymer having the intrinsic viscosity of 0.50 to 0.70 dl/g is preferred.

Where the styrene content in the copolymer is larger than that in the terpolymer by exceeding 20% by weight, the heat resistance, tapping strength and impact resistance deteriorate. When the former is less than the latter by exceeding 5% by weight, the heat resistance, tapping strength and impact strength deteriorate. Preferably, the styrene content in the copolymer minus that in the terpolymer is from +15 to 0% by weight.

Figure 1:
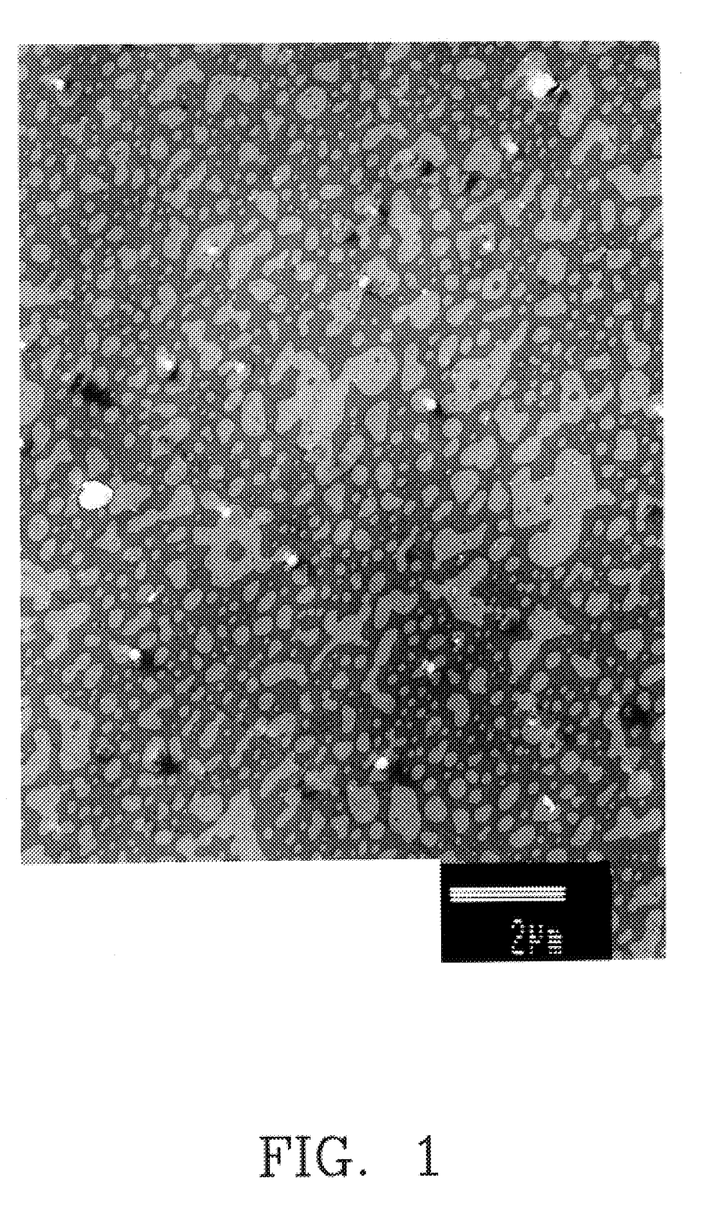
FIG. 1 is a transmission electron microphotograph showing a compatibilized state of the terpolymer (A) and the copolymer (C) in the composition of Comparative Example 2.
Figure 2:
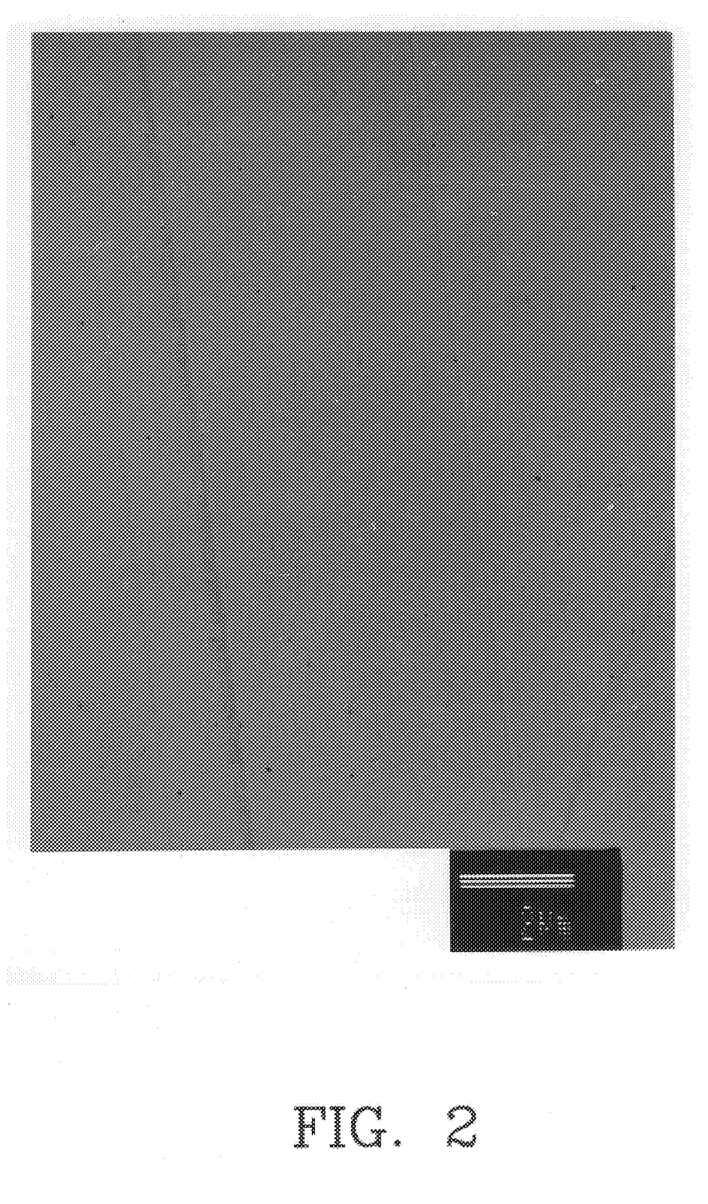
FIG. 2 is a transmission electron microphotograph showing a compatibilized state of the terpolymer (A) and the copolymer (C) in the composition of Example 4.

When the conditions (c) and/or (d) are not satisfied, the terpolymer (A) and the copolymer (C) are present in the uncompatibilized state as seen from the electron microphotograph ($RuO_4$ dying) of FIG. 1, and the mechanical properties tend to decrease. The electron microphotograph of the composition of the present invention in FIG. 2 shows a good compatibilized state of the terpolymer (A) and the copolymer (C).

According to the second aspect of the present invention, there is provided a glass fiber-reinforced thermoplastic resin composition comprising 100 parts by weight of the above composition and 0.01 to 10 parts by weight of the organic silicon compound (E), which has good impact strength as well as a good balance between processability and tapping strength and heat resistance.

ORGANIC SILICON COMPOUND

As the organic silicon compound (E), there are used a polysiloxane represented by the following formula:

wherein $R_1$, $R_2$, $R_3$ and $R_4$ are independently a lower alkyl group or an aryl group, for example, polydimethylsiloxane, polymethylethylsiloxane, polydiethylsiloxane, polymethylphenylsiloxane and the like; a silane compound represented by the formula: $R_1R_2R_3R_4Si$ wherein $R_1$, $R_2$, $R_3$ and $R_4$ are independently a lower alkyl group or an aryl group, for example, tetraethylsilane, trimethylhexylsilane and the like;

an organohalosilane compound of the formula: $R_4$-nSiXn wherein n is a number of 1 to 3, $R_4$ is a lower alkyl group or an aryl group, and X is a halogen atom, for example, triethylchlorosilane, diethyldichlorosilane, phenyltrichlorosilane, diphenyldichlorosilane and the like.

A polymerization degree of the polysiloxane is not limited. Preferably, a number average molecular weight is from $10^3$ to $10^5$.

When the content of the organic silicon compound is less than 0.01 parts by weight, the impact resistance is not sufficiently improved. When it exceeds 10 parts by weight, the heat resistance tends to decrease.

Preferably, the composition contains 0.05 to 5 parts by weight of the organic silicon compound per 100 parts by weight of the first composition.

According to the third aspect of the present invention, there is provided a glass fiber-reinforced thermoplastic resin composition comprising 100 parts by weight of the above first composition and 0.01 to 30 parts by weight of the acid-modified copolymer (F), which has improved tensile strength as well as a good balance between processability and tapping strength and the heat resistance.

ACID-MODIFIED COPOLYMER (F)

The acid-modified copolymer (F) to be added is a copolymer comprising 2 to 20% by weight of an unsaturated carboxylic acid, 30 to 93% by weight of styrene and 5 to 50% by weight of acrylonitrile.

Outside the above composition range, it is difficult to improve tensile strength.

Preferred examples of the unsaturated carboxylic acid are acrylic acid, methacrylic acid, maleic acid, maleic anhydride, fumaric acid, itaconic acid and the like.

When the content of the acid-modified copolymer is less than 0.01 parts by weight, the tensile strength is not sufficiently improved. When it exceeds 30 parts by weight, the processability, heat resistance and impact resistance tend to decrease.

Preferably, the composition contains 0.05 to 15 parts by weight of the acid-modified copolymer (F) per 100 parts by weight of the above first composition.

The acid-modified copolymer (F) may be prepared by any one of the known polymerization processes such as emulsion polymerization, bulk polymerization, suspension polymerization, solution polymerization, and their combination.

The order and manner of addition of the compounds to a reaction system are not limited, and any suitable order and manner of addition (simultaneous, continuous or portion wise addition) may be employed.

According to the fourth aspect of the present invention, there is provided a glass fiber-reinforced thermoplastic resin composition comprising 100 parts by weight of the above first composition and 0.05 to 5 parts by weight of the ethylene-butylene rubber (G), which has improved anisotropy of a mold shrinkage factor as well as a good balance between the processability and tapping strength and the heat resistance.

ETHYLENE-BUTYLENE RUBBER

The ethylene-butylene rubber (G) comprises 70 to 95% by weight of ethylene and 5 to 30% by weight of butylene. Outside this composition range, the anisotropy of the mold shrinkage factor is not sufficiently improved. Preferably, the ethylene-butylene rubber comprises 80 to 95% by weight of ethylene and 5 to 20% by weight of butylene. Such rubber may be prepared by solution polymerization (the Ziegler process).

There is no limitation on the molecular weight. Preferably, the melt flow rate "MFR" (according to ASTM D-1238 at 230° C.) is from 0.1 to 100 g/10 min.

When the content of ethylene-butylene rubber (G) is less than 0.05 parts by weight, the anisotropy of the mold shrinkage factor is not improved, while when it exceeds 5 parts by weight, heat resistance deteriorates. Preferably, the content of ethylene-butylene rubber (G) is from 0.1 to 5 parts by weight.

According to the fifth aspect of the present invention, there is provided a glass fiber-reinforced thermoplastic resin composition comprising 100 parts by weight of the above first composition and 0.05 to 10 parts by weight of the hydrogenated styrene-butadiene block rubber (H), which has improved processability as well as a good balance between processability, tapping strength and heat resistance.

HYDROGENATED STYRENE-BUTADIENE BLOCK RUBBER

When the content of the hydrogenated styrene-butadiene rubber (H) is less than 0.05 parts by weight, processability is not improved further, while when it exceeds 5 parts by weight, heat resistance and stiffness deteriorate. Preferably, the content of hydrogenated styrene-butadiene block rubber (H) is from 0.1 to 5 parts by weight.

The hydrogenated styrene-butadiene block rubber is a rubber prepared by hydrogenating a styrene-butadiene block rubber.

The composition of the styrene-butadiene rubber is not limited. A block rubber comprising 10 to 90% by weight and 95 to 10% by weight is preferred.

A structure of blocks is not critical, and an AB type of styrene polymer block-butadiene polymer block, an ABA type of styrene polymer block-butadiene polymer block-styrene polymer block, and the like are exemplified.

There is no limitation on the preparation process of the styrene-butadiene block rubber, and the block rubber may be prepared by any one of the known processes, for example, a process disclosed in Japanese Patent Publication No. 23798/1965 using a lithium catalyst.

There is not limitation on the method for hydrogenating the styrene-butadiene block rubber either, and the hydrogenation may be carried out by any one of the known methods such as those disclosed in Japanese Patent Publication Nos. 8704/1967 and 6636/1978 and Japanese Patent KOKAI Publication Nos. 133203/1984 and 79005/1985.

In general, the hydrogenated styrene-butadiene block rubber is also named SEBS (styrene-ethylene-butene-styrene) and commercially sold.

According to the sixth aspect of the present invention, there is provided a glass fiber-reinforced thermoplastic resin composition comprising 100 parts by weight of the above first composition and 5 to 50 parts by weight of the graft polymer (I), which provides improved appearance as well as a good balance between processability, tapping strength and heat resistance.

GRAFT POLYMER

The graft polymer (I) is one prepared by polymerizing 25 to 60% by weight of styrene and 5 to 40% by weight of acrylonitrile on 20 to 70% by weight of a rubber which comprises 70 to 95% by weight of ethylene and 5 to 30% by weight of an olefin having 4 to 8 carbon atoms.

The rubber comprising 70 to 95% by weight of ethylene and 5 to 30% by weight of an olefin having 4 to 8 carbon atoms may be prepared by solution polymerization (the Ziegler process). Preferably the rubber is an amorphous or low-crystal rubber comprising 80 to 95% by weight of ethylene and 20 to 5% by weight of an olefin having 4 to 8 carbon atoms. The molecular weight of the ethylene-olefin rubber is not limited. Preferably, the rubber has a melt flow rate (MFR) (according to ASTM D-1238 at 230° C.) of 0.1 to 100 g/10 min.

A composition of the rubber, styrene and acrylonitrile in the graft polymer is also important. Outside the above composition range, it is difficult to improve the appearance.

The graft polymer may be prepared by graft polymerizing styrene and acrylonitrile in the presence of the ethylene-olefin rubber according to a known graft polymerization process. As the graft polymerization process, emulsion polymerization, suspension polymerization, solution polymerization, bulk polymerization, and their combination are exemplified.

When the content of the graft polymer (I) is less than 5 parts by weight, the appearance (surface smoothness) is not improved, while when it exceeds 50 parts by weight, the heat resistance, tapping strength and appearance deteriorate.

In view of the balance between the physical properties and the appearance (surface smoothness), the content of graft polymer (I) is preferably from 10 to 30 parts by weight per 100 parts by weight of the first resin composition.

Each of the resin compositions of the present invention may be prepared by mixing the above polymers, the glass fiber and the additive components in a known mixing apparatus such as a Banbury mixer, rolls, an extruder and the like.

There is no limitation on the mixing order of the polymers, the glass fiber and the additional components, and their states. They may be in the form of pellets, beads or powder and simultaneously mixed. Alternatively, some specific components are premixed and the rest component(s) are mixed, or the rest component(s) are added during mixing of the specific components (in a molten state).

In the preparation of the resin compositions of the present invention, it is possible, if necessary, to compound an additive such as an antioxidant, a UV-light absorber, a light stabilizer, an antistatic agent, a lubricant, a dye, a pigment, a plasticizer, a flame-retardant, a mold-release agent, etc. and other thermoplastic resin such as polycarbonate, polyvinyl chloride, polyamide, polybutylene terephthalate, polyethylene terephthalate, polyphenylene oxide, polyoxymethylene, polymethyl methacrylate, etc.

The present invention will be explained by making reference to Examples, which do not limit the present invention. In the compositions, "parts" and "%" are all "by weight".

The terpolymer (A), graft polymer (B), copolymer (C), acid modified copolymer (F) and graft polymer (I) used hereinafter were those prepared by the following methods.

As the glass fiber (D), organic silicon compound (E), ethylene-butadiene rubber (G) and hydrogenated styrene-butadiene block rubber (H), the below described ones are used.

(A) Terpolymer

In a reactor equipped with a stirrer and baffle plates, pure water (70 parts), a polymerization initiator (potassium persulfate) (0.2 part) and an emulsifier (sodium laurylsulfate) (0.1 part) were charged. After replacing the internal atmosphere of the reactor with nitrogen gas, the mixture was heated while stirring. When the reactor temperature reached 65° C., 3% of a mixture of the monomers and a molecular weight modifier (tert.-dodecylmercaptan) shown in Table 1 was added, and the temperature was raised to 70° C. over 30 minutes. Then, the remaining monomer mixture (97%) and an aqueous solution consisting of pure water (50 parts), the polymerization initiator (potassium persulfate) (0.1 part) and the emulsifier (sodium laurylsulfate) (1 part) were continuously added over 5 hours. Thereafter, the temperature was raised to 75° C., and the polymerization was further continued for 2 hours. A resulting polymer latex was coagulated with an aqueous solution of calcium chloride to obtain a terpolymer (A-1 to A-8).

An intrinsic viscosity of each terpolymer was adjusted by changing an amount of the molecular weight modifier.

(B) Graft Polymer (1) "ABS Resin"

In a reactor equipped with a stirrer and baffle plates, pure water (30 parts), a polymerization initiator (ferrous sulfate heptahydrate (0.002 part), sodium pyrophosphate (0.1 part), dextrose (0.3 part) and a polybutadiene latex having a weight average particle size of 0.30 $\mu$m and a solid content of 50% and containing sodium dodecylbenzenesulfonate as an emulsifier (50 parts) were charged. After replacing the internal atmosphere of the reactor with nitrogen gas, the temperature was raised to 70° C. while stirring. Then, styrene (35 parts), acrylonitrile (15 parts), a molecular weight modifier (tert.-dodecylmercaptan) (0.3 part) and an aqueous solution consisting of pure water (20 parts), a polymerization initiator (cumene hydroperoxide) (0.2 part) and an emulsifier (sodium dodecylbenzenesulfonate) (0.7 part) were continuously added over 4 hours. Thereafter, the polymerization was further continued at 75° C. for 2 hours. The resulting polymer latex was coagulated with an aqueous solution of calcium chloride to obtain a graft polymer having a graft ratio of 35%, a weight average particle size of 0.32 $\mu$m and an intrinsic viscosity of ungrafted polymer of 0.61.

(B) Graft Polymer (2) "AES Resin"

In a reactor equipped with a stirrer and baffle plates the interior atmosphere of which had been replaced with nitrogen gas, there was added a rubber solution of an ethylene-propylene-ethylidenenorbornene rubber (propylene content of 50%, an iodine value of 9, and a Mooney viscosity of 87) (20 parts) dissolved in a solvent mixture (400 parts of n-hexane and 200 parts of ethylene dichloride). Then, styrene (60 parts), acrylonitrile (30 parts) and a polymerization initiator (tert.-butyl peroxypivalate) (3 parts) were added and the polymerization was carried out at 100° C. for 10 hours.

The polymerization liquid was contacted with a large excess amount of methanol, and a precipitated material was separated and dried to obtain a graft polymer (B-1) having a rubber content of 20% and a graft ratio of 52%.

(B) Graft Polymer (3) "A-EB-S Resin"

In a reactor equipped with a stirrer and baffle plates the interior atmosphere of which had been replaced with nitrogen gas, an ethylene (90%)-butylene (10%) rubber (20 parts) was dissolved in a solvent (ethylbenzene) (300 parts) and then styrene (70 parts), acrylonitrile (25 parts) and a polymerization initiator (benzoyl peroxide) (2 parts) were added. The polymerization was carried out at 67° C. for 10 hours. The polymerization liquid was contacted with a large excess amount of methanol, and a precipitated material was separated and dried to obtain a graft polymer (B-2) having a rubber content of 20% and a graft ratio of 35%.

(C) Copolymer

In a reactor equipped with a stirrer and baffle plates, pure water (120 parts) and a polymerization initiator (potassium persulfate) (0.3 part) were charged. After replacing the internal atmosphere of the reactor with nitrogen gas, the mixture was heated while stirring. When a reactor temperature reached 68° C., 30% of a monomer mixture consisting of styrene, acrylonitrile and a molecular weight modifier (tert.-dodecylmercaptan) shown in Table 2 and 30% of an aqueous emulsifier solution consisting of an emulsifier (sodium dodecylbenzenesulfonate) (2 parts) and pure water (28 parts) were continuously added over 5 hours. Then, 70% of the monomer mixture and 70% of the aqueous emulsifier solution were continuously added over 5 hours. Thereafter the polymerization was continued at 70° C. for further 3 hours.

The resulting polymer latex was coagulated with an aqueous solution of calcium chloride to obtain a copolymer (C-1 to C-7).

An intrinsic viscosity of each copolymer was adjusted by changing an amount of the molecular weight modifier.

(D) Glass Fiber

Glass fiber surface of which was treated with a silane compound having an average fiber length of 6 mm and a fiber diameter of 9 $\mu$m.

(E) Organic Silicon Compound

Polymethylsiloxane (a number average molecular weight of 28,000).

(F) Acid-Modified Copolymer

In a reactor equipped with a stirrer and baffle plates, pure water (120 parts) and a polymerization initiator (potassium persulfate) (0.3 part) were charged. After replacing the internal atmosphere of the reactor with nitrogen gas, the mixture was heated while stirring. When the reactor temperature reached 65° C., a monomer mixture consisting of styrene (65 parts), acrylonitrile (30 parts), methacrylic acid (5 parts) and a molecular weight modifier (tert.-dodecylmercaptan) (0.3 part) and an aqueous emulsifier solution consisting of an emulsifier (sodium dodecylbenzenesulfonate) (2 parts) and pure water (28 parts) were continuously added over 5 hours. Then, the polymerization was continued at 70° C. for further 3 hours.

The resulting polymer latex was coagulated with an aqueous solution of calcium chloride to obtain an acid-modified copolymer (F) having an intrinsic viscosity of 0.54.

(G) Ethylene-Butylene Rubber

An ethylene-butylene rubber comprising 87% of ethylene and 13% of butylene and having MFR of 1.0.

(H) Hydrogenated Styrene-Butadiene Block Rubber (1) Commercially sold hydrogenated linear styrenebutadiene block rubber (Krayton G-1657X available from Shell). Properties of Krayton G-1657X: specific gravity= 0.90; Shore A hardness=65; solution viscosity (at 25° C.)=1100 cps; styrene/butadiene ratio=13/87.

(2) Commercially sold hydrogenated linear styrene butadiene block rubber (Krayton G-1650X available from Shell). Properties of Krayton G-1650X: specific gravity= 0.91; Shore A hardness=75; solution viscosity (at 25° C.)=1500 cps; styrene/butadiene ratio=29/71.

(I) Graft Copolymer

In a reactor equipped with a stirrer and baffle plates the interior atmosphere of which had been replaced with nitrogen gas, an ethylene (90%)-butylene (10%) rubber (20 parts) was dissolved in a solvent (ethylbenzene) (300 parts), and then styrene (70 parts), acrylonitrile (25 parts) and a polymerization initiator (benzoyl peroxide) (2 parts) were added. The polymerization was carried out at 67° C. for 10 hours. The polymerization liquid was contacted with a large excess amount of methanol, and a precipitated material was separated and dried to obtain a graft polymer (I) having a rubber content of 20% and a graft ratio of 35%.

EXAMPLES AND COMPARATIVE EXAMPLES

The above terpolymer (A), graft copolymer (B), copolymer (C), glass fiber (D), organic silicon compound (E), acid-modified copolymer (F), ethylene-butylene rubber (G), hydrogenated styrene-butadiene block rubber (H) and graft polymer (I) were kneaded in a vented 40 mm twin-screw extruder at 250° to 300° C. to produce each composition (in pellet form). Formulations are shown in Tables 3, 5–7, 9 and 11, and the properties of the compositions are shown in Tables 4, 8, 10 and 12.

The properties of the compositions are measured as follows:

(1) Preparation of sample piece for property measurement

Pellets produced in each of the Examples and Comparative Examples were molded using a 3.5 ounce injection molding machine at a cylinder temperature of 260° C. to obtain a sample piece.

(2) Measurement of properties (i) Impact resistance

Unnotched Izod impact strength

According to ASTM D-256. Units: Kg.cm/cm (⅛ inch thickness). 23° C.

(ii) Tapping strength

When a JIS M-4 bolt was screwed in a boss having an inner diameter of 3.4 mm, an upper outer diameter of 9.2 mm, a lower outer diameter of 10.0 mm and a height of 25 mm to a distance of 12 mm, a strength by which the boss was broken was measured using COMPUTORQUE (Model 2502 Cl manufactured by Consolided Device Inc.).

(iii) Heat resistance

According to ASTM D-648.

(¼ inch thickness) 18.6 Kg/cm$^2$. No annealing. Unit: °C.

(iv) Processability

Melt flow index: According to ASTM D-1338 265° C., 3.8 Kg. Unit: g/10 min.

Bar flow length: Using a bar flow mold having a part size of 25 mm in width, 3 mm in thickness and 1000 mm in length, the composition was molded by an injection molding machine at a molding temperature of 250° C. and a mold temperature of 50° C. under an injection pressure of 70 Kg/cm$^2$, and the length of the molded article was measured. Unit: mm.

(v) Tensile strength

According to ASTM D-638. Unit: kg/cm$^2$.

(vi) Specific gravity

According to ASTM D-792.

(vii) Anisotropy

Using a plate mold having a part size of 150 mm in length, 90 mm in width and 3 mm in thickness, an article was injection molded at a preset temperature of 260° C. and a mold temperature of 50° C. under an injection pressure (minimum charge pressure) of +10 kg/cm$^2$, and the difference between the mold shrinkage factor in the machine direction and that in the transverse directions was calculated. Unit: %.

(viii) Appearance

Using a surface roughness meter (SURFCOM 570-3DF manufactured by Tokyo Seimitsu Co., Ltd.), the surface roughness of a molded article was measured and an average surface roughness (sRa) was calculated. Unit: μm.

Table 1 shows the compositions of the terpolymers (A). A-1 and A-8 were outside the composition range of the present invention, and A-4 had the composition inside the composition range of the present invention but a too high intrinsic viscosity.

Table 2 shows the compositions of the copolymers (C). C-3 and C-5 had the compositions inside the composition range of the present invention but a too high intrinsic viscosity or too low intrinsic viscosity.

Tables 3 and 4 show the influence of the composition of the components and the conditions (a) to (d) on the properties of the resin compositions containing the diene rubber base graft polymer as the graft polymer (B).

Tables 5 and 6 show the influence of the composition of the components and the conditions (a) to (d) on the properties of the resin compositions containing the ethylene-propylene rubber or ethylene-butylene rubber base graft polymer as the graft polymer (B), and the effects of the addition of organic silicon compound and acid modified copolymer.

Tables 7 and 8 show the effect of the further addition of ethylene-butylene rubber (G) to the first resin compositions.

Tables 9 and 10 show the effect of the further addition of hydrogenated styrene-butadiene rubber (H) to the first resin composition.

Tables 11 and 12 show the effect of the further addition of ethylene-olefin rubber base graft polymer (I) to the composition comprising the diene rubber or ethylene-propylene rubber base graft polymer as the graft polymer (B).

EFFECTS OF THE INVENTION

The present invention provides a resin composition which has superior balance between processability, tapping strength and heat resistance to the conventional fiber glass-reinforced resin composition, and the resin composition of the present invention can be used for the production of parts having complicated shapes or thin wall articles which require excellent processability and tapping strength, as well as the production of automobile parts such as instrument panels or lamp housings, roller bearings, and business and office machines such as chassis which are produced from conventional resin compositions.

In addition, a wall thickness of a part can be made thinner and therefore the weight of a part can be decreased because of the improved mechanical and thermal properties.

In the Tables which follow, intrinsic viscosity is specified in dl/g and styrene content difference is specified in % by weight

TABLE 1

|  | A-1 | A-2 | A-3 | A-4 | A-5 | A-6 | A-7 | A-8 |
|---|---|---|---|---|---|---|---|---|
| Composition (parts): |  |  |  |  |  |  |  |  |
| N-Phenylmaleimide | 55 | 15 | 23 | 23 | 20 | 20 | 13 | 3 |
| Styrene | 35 | 65 | 62 | 62 | 68 | 68 | 77 | 68 |
| Acrylonitrile | 10 | 20 | 15 | 15 | 12 | 12 | 10 | 29 |
| Molecular weight modifier | 0.80 | 0.65 | 0.60 | 0.05 | 0.65 | 0.25 | 0.50 | 0.90 |
| Intrinsic viscosity | 0.40 | 0.40 | 0.40 | 0.81 | 0.40 | 0.65 | 0.40 | 0.34 |

TABLE 2

|  | C-1 | C-2 | C-3 | C-4 | C-5 | C-6 | C-7 |
|---|---|---|---|---|---|---|---|
| Composition (parts): |  |  |  |  |  |  |  |
| Styrene | 77 | 73 | 73 | 70 | 70 | 62 | 57 |
| Acrylonitrile | 23 | 27 | 27 | 30 | 30 | 38 | 43 |
| Molecular weight modifier | 0.20 | 0.17 | 0.05 | 0.15 | 0.55 | 0.22 | 0.25 |
| Intrinsic viscosity | 0.55 | 0.58 | 1.10 | 0.63 | 0.36 | 0.58 | 0.58 |

TABLE 3

| Composition | Terpolymer (A) % | Graft polymer (B) % | Copolymer (C) % | Glass fiber (D) % | Silicon compound (E) parts | Acid-mod. copolymer (F) parts | Intrinsic viscosity (A) | Intrinsic viscosity (C) | Styrene content difference |
|---|---|---|---|---|---|---|---|---|---|
| Co. Ex. 1 | A-1: 40 | B-1: 15 | C-4: 35 | 10 |  |  | 0.40 | 0.63 | 35 |
| Co. Ex. 2 | A-2: 40 | B-1: 15 | C-1: 35 | 10 |  |  | 0.40 | 0.55 | 22 |
| Exam. 1 | A-2: 40 | B-1: 15 | C-4: 35 | 10 |  |  | 0.40 | 0.63 | 15 |
| Exam. 2 | A-2: 40 | B-1: 15 | C-7: 35 | 10 |  |  | 0.40 | 0.58 | 2 |
| Exam. 3 | A-3: 40 | B-1: 15 | C-1: 35 | 10 |  |  | 0.40 | 0.55 | 15 |
| Exam. 4 | A-3: 40 | B-1: 15 | C-2: 35 | 10 |  |  | 0.40 | 0.58 | 11 |
| Exam. 5 | A-3: 40 | B-1: 15 | C-2: 35 | 10 | 0.1 |  | 0.40 | 0.58 | 11 |
| Exam. 6 | A-3: 40 | B-1: 15 | C-2: 35 | 10 |  | 0.5 | 0.40 | 0.58 | 11 |
| Exam. 7 | A-3: 40 | B-1: 15 | C-2: 35 | 10 | 0.1 | 0.5 | 0.40 | 0.58 | 11 |
| Exam. 8 | A-3: 40 | B-1: 15 | C-2: 30 | 15 |  |  | 0.40 | 0.58 | 11 |
| Co. Ex. 3 | A-3: 40 | B-1: 15 | C-2: 5 | 40 |  |  | 0.40 | 0.58 | 11 |
| Co. Ex. 4 | A-3: 30 | B-1: 10 | C-3: 50 | 10 |  |  | 0.40 | 1.10 | 11 |
| Exam. 9 | A-3: 30 | B-1: 10 | C-4: 50 | 10 |  |  | 0.40 | 0.63 | 8 |
| Co. Ex. 5 | A-3: 30 | B-1: 10 | C-5: 50 | 10 |  |  | 0.40 | 0.36 | 8 |
| Co. Ex. 6 | A-4: 30 | B-1: 10 | C-4: 50 | 10 |  |  | 0.81 | 0.63 | 8 |
| Exam. 10 | A-3: 30 | B-1: 10 | C-6: 50 | 10 |  |  | 0.40 | 0.58 | 0 |
| Co. Ex. 7 | A-4: 30 | B-1: 10 | C-6: 50 | 10 |  |  | 0.81 | 0.58 | 0 |
| Exam. 11 | A-5: 30 | B-1: 10 | C-2: 50 | 10 |  |  | 0.40 | 0.58 | 5 |
| Co. Ex. 8 | A-6: 30 | B-1: 10 | C-2: 50 | 10 |  |  | 0.65 | 0.58 | 5 |
| Exam. 12 | A-5: 20 | B-1: 8 | C-4: 60 | 12 |  |  | 0.40 | 0.63 | 2 |
| Co. Ex. 9 | A-6: 20 | B-1: 8 | C-4: 60 | 12 |  |  | 0.65 | 0.63 | 2 |
| Co. Ex. 10 | A-5: 20 | B-1: 8 | C-6: 60 | 12 |  |  | 0.40 | 0.58 | -6 |
| Co. Ex. 11 | A-5: 20 | B-1: 8 | C-7: 60 | 12 |  |  | 0.40 | 0.58 | -11 |
| Co. Ex. 12 | A-8: 20 | B-1: 8 | C-2: 60 | 12 |  |  | 0.34 | 0.58 | 5 |
| Exam. 13 | A-7: 20 | B-1: 8 | C-1: 60 | 12 |  |  | 0.40 | 0.55 | 0 |

TABLE 3-continued

| Composition | Terpolymer (A) % | Graft polymer (B) % | Copolymer (C) % | Glass fiber (D) % | Silicon compound (E) parts | Acid-mod. copolymer (F) parts | Intrinsic viscosity (A) | Intrinsic viscosity (C) | Styrene content difference |
|---|---|---|---|---|---|---|---|---|---|
| Co. Ex. 13 | A-7: 20 | B-1: 8 | C-6: 60 | 12 | | | 0.40 | 0.58 | −15 |
| Co. Ex. 14 | A-7: 20 | B-1: 8 | C-7: 60 | 12 | | | 0.40 | 0.58 | −20 |

TABLE 4

| | Processability | | Tapping strength | Heat resistance | Impact resistance | Tensile strength | Specific gravity |
|---|---|---|---|---|---|---|---|
| | Melt flow index | Bar flow length | | | | | |
| Co. Ex. 1 | 12 | 260 | 30 | 114 | 10 | 650 | 1.17 |
| Co. Ex. 2 | 26 | 365 | 30 | 103 | 11 | 670 | 1.14 |
| Exam. 1 | 20 | 320 | 50 | 110 | 17 | 760 | 1.14 |
| Exam. 2 | 20 | 320 | 47 | 111 | 16 | 750 | 1.14 |
| Exam. 3 | 27 | 380 | 55 | 114 | 18 | 780 | 1.15 |
| Exam. 4 | 27 | 380 | 60 | 115 | 20 | 800 | 1.15 |
| Exam. 5 | 27 | 380 | 60 | 115 | 24 | 800 | 1.15 |
| Exam. 6 | 27 | 380 | 62 | 115 | 20 | 840 | 1.15 |
| Exam. 7 | 27 | 380 | 62 | 115 | 24 | 840 | 1.15 |
| Exam. 8 | 23 | 345 | 65 | 117 | 25 | 860 | 1.19 |
| Co. Ex. 3 | 18 | 305 | >70 | 123 | 14 | 1120 | 1.36 |
| Co. Ex. 4 | 12 | 260 | 65 | 112 | 22 | 820 | 1.14 |
| Exam. 9 | 26 | 365 | 63 | 112 | 20 | 810 | 1.14 |
| Co. Ex. 5 | 32 | 410 | 32 | 112 | 16 | 640 | 1.14 |
| Co. Ex. 6 | 11 | 250 | 65 | 112 | 20 | 810 | 1.14 |
| Exam. 10 | 25 | 360 | 62 | 112 | 19 | 800 | 1.14 |
| Co. Ex. 7 | 12 | 260 | 63 | 112 | 20 | 810 | 1.14 |
| Exam. 11 | 27 | 380 | 62 | 111 | 20 | 800 | 1.14 |
| Co. Ex. 8 | 15 | 285 | 63 | 111 | 21 | 810 | 1.14 |
| Exam. 12 | 30 | 395 | 63 | 108 | 18 | 820 | 1.15 |
| Co. Ex. 9 | 17 | 290 | 54 | 108 | 17 | 830 | 1.15 |
| Co. Ex. 10 | 32 | 410 | 32 | 100 | 10 | 710 | 1.15 |
| Co. Ex. 11 | 32 | 410 | 32 | 99 | 10 | 720 | 1.15 |
| Co. Ex. 12 | 39 | 455 | 52 | 96 | 14 | 820 | 1.13 |
| Exam. 13 | 34 | 420 | 58 | 105 | 16 | 810 | 1.14 |
| Co. Ex. 13 | 33 | 415 | 32 | 99 | 10 | 700 | 1.14 |
| Co. Ex. 14 | 33 | 415 | 32 | 96 | 10 | 710 | 1.14 |

TABLE 5

| Composition | Terpolymer (A) % | Graft polymer (B) % | Copolymer (C) % | Glass fiber (D) % | Silicon compound (E) parts | Acid-mod. copolymer (F) parts | Intrinsic viscosity (A) | Intrinsic viscosity (C) | Styrene content difference |
|---|---|---|---|---|---|---|---|---|---|
| Co. Ex. 15 | A-1: 40 | B-2: 15 | C-4: 35 | 10 | | | 0.40 | 0.63 | 35 |
| Co. Ex. 16 | A-2: 40 | B-2: 15 | C-1: 35 | 10 | | | 0.40 | 0.55 | 22 |
| Exam. 14 | A-2: 40 | B-2: 15 | C-4: 35 | 10 | | | 0.40 | 0.63 | 15 |
| Exam. 15 | A-2: 40 | B-2: 15 | C-7: 35 | 10 | | | 0.40 | 0.58 | 2 |
| Exam. 16 | A-3: 40 | B-2: 15 | C-1: 35 | 10 | | | 0.40 | 0.55 | 15 |
| Exam. 17 | A-3: 40 | B-2: 15 | C-2: 35 | 10 | | | 0.40 | 0.58 | 11 |
| Exam. 18 | A-3: 40 | B-2: 15 | C-2: 35 | 10 | 0.1 | | 0.40 | 0.58 | 11 |
| Exam. 19 | A-3: 40 | B-2: 15 | C-2: 35 | 10 | | 0.5 | 0.40 | 0.58 | 11 |
| Exam. 20 | A-3: 40 | B-2: 15 | C-2: 35 | 10 | 0.1 | 0.5 | 0.40 | 0.58 | 11 |
| Exam. 21 | A-3: 40 | B-2: 15 | C-2: 35 | 15 | | | 0.40 | 0.58 | 11 |
| Co. Ex. 17 | A-3: 40 | B-2: 15 | C-2: 5 | 40 | | | 0.40 | 0.58 | 11 |
| Co. Ex. 18 | A-3: 30 | B-2: 10 | C-3: 50 | 10 | | | 0.40 | 1.10 | 11 |
| Exam. 22 | A-3: 30 | B-2: 10 | C-4: 50 | 10 | | | 0.40 | 0.63 | 8 |
| Co. Ex. 19 | A-3: 30 | B-2: 10 | C-5: 50 | 10 | | | 0.40 | 0.36 | 8 |
| Co. Ex. 20 | A-4: 30 | B-2: 10 | C-4: 50 | 10 | | | 0.81 | 0.63 | 8 |
| Exam. 23 | A-3: 30 | B-2: 10 | C-6: 50 | 10 | | | 0.40 | 0.58 | 0 |
| Co. Ex. 21 | A-4: 30 | B-2: 10 | C-6: 50 | 10 | | | 0.81 | 0.58 | 0 |
| Exam. 24 | A-5: 30 | B-2: 10 | C-2: 50 | 10 | | | 0.40 | 0.58 | 5 |
| Co. Ex. 22 | A-6: 30 | B-2: 10 | C-2: 50 | 10 | | | 0.65 | 0.58 | 5 |
| Exam. 25 | A-5: 20 | B-2: 8 | C-4: 60 | 12 | | | 0.40 | 0.63 | 2 |
| Co. Ex. 23 | A-6: 20 | B-2: 8 | C-4: 60 | 12 | | | 0.65 | 0.63 | 2 |
| Co. Ex. 24 | A-5: 20 | B-2: 8 | C-6: 60 | 12 | | | 0.40 | 0.58 | −6 |
| Co. Ex. 25 | A-5: 20 | B-2: 8 | C-7: 60 | 12 | | | 0.40 | 0.58 | −11 |
| Co. Ex. 26 | A-8: 20 | B-2: 8 | C-2: 60 | 12 | | | 0.34 | 0.58 | 5 |

TABLE 5-continued

| Composition | Terpolymer (A) % | Graft polymer (B) % | Copolymer (C) % | Glass fiber (D) % | Silicon compound (E) parts | Acid-mod. copolymer (F) parts | Intrinsic viscosity (A) | Intrinsic viscosity (C) | Styrene content difference |
|---|---|---|---|---|---|---|---|---|---|
| Exam. 26 | A-7: 20 | B-2: 8 | C-1: 60 | 12 | | | 0.40 | 0.55 | 0 |
| Co. Ex. 27 | A-7: 20 | B-2: 8 | C-6: 60 | 12 | | | 0.40 | 0.58 | −15 |
| Co. Ex. 28 | A-7: 20 | B-2: 8 | C-7: 60 | 12 | | | 0.40 | 0.58 | −20 |

TABLE 6

| Composition | Terpolymer (A) % | Graft polymer (B) % | Copolymer (C) % | Glass fiber (D) % | Silicon compound (E) parts | Acid-mod. copolymer (F) parts | Intrinsic viscosity (A) | Intrinsic viscosity (C) | Styrene content difference |
|---|---|---|---|---|---|---|---|---|---|
| Co. Ex. 29 | A-2: 40 | B-3: 15 | C-1: 35 | 10 | | | 0.40 | 0.55 | 22 |
| Exam. 27 | A-2: 40 | B-3: 15 | C-7: 35 | 10 | | | 0.40 | 0.58 | 2 |
| Exam. 28 | A-3: 40 | B-3: 15 | C-2: 35 | 10 | | | 0.40 | 0.58 | 11 |
| Exam. 29 | A-3: 40 | B-3: 15 | C-2: 35 | 10 | 0.1 | | 0.40 | 0.58 | 11 |
| Exam. 30 | A-3: 40 | B-3: 15 | C-2: 35 | 10 | | 0.5 | 0.40 | 0.58 | 11 |
| Exam. 31 | A-3: 40 | B-3: 15 | C-2: 35 | 10 | 0.1 | 0.5 | 0.40 | 0.58 | 11 |
| Exam. 32 | A-3: 40 | B-3: 15 | C-2: 30 | 15 | | | 0.40 | 0.58 | 11 |
| Co. Ex. 30 | A-3: 40 | B-3: 15 | C-2: 5 | 40 | | | 0.40 | 0.58 | 11 |
| Co. Ex. 31 | A-3: 30 | B-3: 10 | C-3: 50 | 10 | | | 0.40 | 1.10 | 11 |
| Exam. 33 | A-3: 30 | B-3: 10 | C-4: 50 | 10 | | | 0.40 | 0.63 | 8 |
| Co. Ex. 32 | A-3: 30 | B-3: 10 | C-5: 50 | 10 | | | 0.40 | 0.36 | 8 |
| Co. Ex. 33 | A-4: 30 | B-3: 10 | C-4: 50 | 10 | | | 0.81 | 0.63 | 8 |
| Exam. 34 | A-3: 30 | B-3: 10 | C-6: 50 | 10 | | | 0.40 | 0.58 | 0 |
| Co. Ex. 34 | A-4: 30 | B-3: 10 | C-6: 50 | 10 | | | 0.81 | 0.58 | 0 |
| Exam. 35 | A-5: 30 | B-3: 10 | C-2: 50 | 10 | | | 0.40 | 0.58 | 5 |
| Co. Ex. 35 | A-6: 30 | B-3: 10 | C-2: 50 | 10 | | | 0.65 | 0.58 | 5 |
| Co. Ex. 36 | A-5: 20 | B-3: 8 | C-6: 60 | 12 | | | 0.40 | 0.58 | −6 |
| Co. Ex. 37 | A-8: 20 | B-3: 8 | C-2: 60 | 12 | | | 0.34 | 0.58 | 5 |
| Exam. 36 | A-7: 20 | B-3: 8 | C-1: 60 | 12 | | | 0.40 | 0.55 | 0 |

TABLE 7

| Composition | Terpolymer (A) % | Graft polymer (B) % | Copolymer (C) % | Glass fiber (D) % | Rubber (G) parts | Intrinsic viscosity (A) | Intrinsic viscosity (C) | Styrene content difference |
|---|---|---|---|---|---|---|---|---|
| Co. Ex. 1 | A-1: 40 | B-1: 15 | C-4: 35 | 10 | 0 | 0.40 | 0.63 | 35 |
| Co. Ex. 2 | A-2: 40 | B-1: 15 | C-1: 35 | 10 | 0 | 0.40 | 0.55 | 22 |
| Exam. 2 | A-2: 40 | B-1: 15 | C-7: 35 | 10 | 0 | 0.40 | 0.58 | 2 |
| Exam. 3 | A-3: 40 | B-1: 15 | C-1: 35 | 10 | 0 | 0.40 | 0.55 | 15 |
| Exam. 37 | A-3: 40 | B-1: 15 | C-1: 35 | 10 | 3 | 0.40 | 0.55 | 15 |
| Co. Ex. 38 | A-3: 40 | B-1: 15 | C-1: 35 | 10 | 10 | 0.40 | 0.55 | 15 |
| Exam. 16 | A-3: 40 | B-2: 15 | C-1: 35 | 10 | 0 | 0.40 | 0.55 | 15 |
| Exam. 38 | A-3: 40 | B-2: 15 | C-1: 35 | 10 | 3 | 0.40 | 0.55 | 15 |
| Co. Ex. 39 | A-3: 40 | B-3: 15 | C-1: 35 | 10 | 0 | 0.40 | 0.55 | 15 |
| Exam. 39 | A-3: 40 | B-3: 15 | C-1: 35 | 10 | 3 | 0.40 | 0.55 | 15 |
| Co. Ex. 40 | A-3: 40 | B-1: 15 | C-2: 30 | 15 | 0 | 0.40 | 0.58 | 11 |
| Co. Ex. 3 | A-3: 40 | B-1: 15 | C-2: 5 | 40 | 0 | 0.40 | 0.58 | 11 |
| Co. Ex. 4 | A-3: 30 | B-1: 10 | C-3: 50 | 10 | 0 | 0.40 | 1.10 | 11 |
| Exam. 9 | A-3: 30 | B-1: 10 | C-4: 50 | 10 | 0 | 0.40 | 0.63 | 8 |
| Co. Ex. 5 | A-3: 30 | B-1: 10 | C-5: 50 | 10 | 0 | 0.40 | 0.36 | 8 |
| Co. Ex. 6 | A-4: 30 | B-1: 10 | C-4: 50 | 10 | 0 | 0.81 | 0.63 | 8 |
| Exam. 11 | A-5: 30 | B-1: 10 | C-2: 50 | 10 | 0 | 0.40 | 0.58 | 5 |
| Exam. 40 | A-5: 30 | B-1: 10 | C-2: 50 | 10 | 2 | 0.40 | 0.58 | 5 |
| Exam. 24 | A-5: 30 | B-2: 10 | C-2: 50 | 10 | 0 | 0.40 | 0.58 | 5 |
| Exam. 41 | A-5: 30 | B-2: 10 | C-2: 50 | 10 | 1.5 | 0.40 | 0.58 | 5 |
| Exam. 35 | A-5: 30 | B-3: 10 | C-2: 50 | 10 | 0 | 0.40 | 0.58 | 5 |
| Exam. 42 | A-5: 30 | B-3: 10 | C-2: 50 | 10 | 1 | 0.40 | 0.58 | 5 |
| Co. Ex. 8 | A-6: 30 | B-1: 10 | C-2: 50 | 10 | 0 | 0.65 | 0.58 | 5 |
| Co. Ex. 10 | A-5: 20 | B-1: 8 | C-6: 60 | 12 | 0 | 0.40 | 0.58 | −6 |
| Co. Ex. 12 | A-8: 20 | B-1: 8 | C-2: 60 | 12 | 0 | 0.34 | 0.58 | 5 |
| Exam. 13 | A-7: 20 | B-1: 8 | C-1: 60 | 12 | 0 | 0.40 | 0.55 | 0 |
| Exam. 43 | A-7: 20 | B-1: 8 | C-1: 60 | 12 | 0.5 | 0.40 | 0.55 | 0 |
| Exam. 26 | A-7: 20 | B-2: 8 | C-1: 60 | 12 | 0 | 0.40 | 0.55 | 0 |
| Exam. 44 | A-7: 20 | B-2: 8 | C-1: 60 | 12 | 0.5 | 0.40 | 0.55 | 0 |

TABLE 7-continued

| Composition | Terpolymer (A) % | Graft polymer (B) % | Copolymer (C) % | Glass fiber (D) % | Rubber (G) parts | Intrinsic viscosity (A) | Intrinsic viscosity (C) | Styrene content difference |
|---|---|---|---|---|---|---|---|---|
| Exam. 35 | A-7: 20 | B-3: 8 | C-1: 60 | 12 | 0 | 0.40 | 0.55 | 0 |
| Exam. 45 | A-7: 20 | B-3: 8 | C-1: 60 | 12 | 0.5 | 0.40 | 0.55 | 0 |

TABLE 8

| | Processability | | | | Heat resistance | Impact resistance | Tensile strength | Specific gravity |
|---|---|---|---|---|---|---|---|---|
| | Melt flow index | Bar flow length | Tapping strength | Aniso tropy | | | | |
| Co. Ex. 1 | 12 | 260 | 30 | 0.09 | 114 | 10 | 650 | 1.17 |
| Co. Ex. 2 | 26 | 365 | 30 | 0.09 | 103 | 11 | 670 | 1.14 |
| Exam. 2 | 20 | 320 | 47 | 0.09 | 111 | 16 | 750 | 1.14 |
| Exam. 3 | 27 | 380 | 55 | 0.09 | 114 | 18 | 780 | 1.15 |
| Exam. 37 | 29 | 390 | 53 | 0.07 | 114 | 18 | 760 | 1.15 |
| Co. Ex. 38 | 31 | 405 | 30 | 0.05 | 112 | 10 | 700 | 1.11 |
| Exam. 16 | 27 | 380 | 45 | 0.09 | 114 | 18 | 780 | 1.14 |
| Exam. 36 | 29 | 390 | 43 | 0.07 | 114 | 18 | 760 | 1.14 |
| Co. Ex. 39 | 27 | 380 | 49 | 0.09 | 114 | 17 | 780 | 1.14 |
| Exam. 39 | 29 | 390 | 47 | 0.07 | 114 | 17 | 760 | 1.14 |
| Co. Ex. 40 | 23 | 345 | 65 | 0.10 | 117 | 25 | 860 | 1.19 |
| Co. Ex. 3 | 18 | 305 | >70 | 0.12 | 123 | 14 | 1120 | 1.36 |
| Co. Ex. 4 | 12 | 260 | 65 | 0.09 | 112 | 22 | 820 | 1.14 |
| Exam. 9 | 26 | 365 | 63 | 0.09 | 112 | 20 | 810 | 1.14 |
| Co. Ex. 5 | 32 | 410 | 32 | 0.09 | 112 | 16 | 640 | 1.14 |
| Co. Ex. 6 | 11 | 250 | 65 | 0.09 | 112 | 20 | 810 | 1.14 |
| Exam. 11 | 27 | 380 | 62 | 0.09 | 111 | 20 | 800 | 1.14 |
| Exam. 40 | 28 | 385 | 60 | 0.07 | 111 | 20 | 800 | 1.14 |
| Exam. 24 | 27 | 380 | 52 | 0.09 | 111 | 20 | 800 | 1.13 |
| Exam. 41 | 28 | 385 | 50 | 0.07 | 111 | 19 | 800 | 1.13 |
| Exam. 35 | 27 | 380 | 57 | 0.09 | 111 | 19 | 800 | 1.13 |
| Exam. 42 | 27 | 380 | 56 | 0.08 | 111 | 19 | 790 | 1.13 |
| Co. Ex. 8 | 15 | 285 | 63 | 0.09 | 111 | 21 | 810 | 1.14 |
| Co. Ex. 10 | 32 | 410 | 32 | 0.09 | 100 | 10 | 710 | 1.15 |
| Co. Ex. 12 | 39 | 455 | 52 | 0.09 | 96 | 14 | 820 | 1.13 |
| Exam. 13 | 34 | 420 | 58 | 0.09 | 105 | 16 | 810 | 1.14 |
| Exam. 43 | 34 | 420 | 58 | 0.08 | 105 | 16 | 810 | 1.14 |
| Exam. 26 | 34 | 420 | 48 | 0.09 | 105 | 16 | 810 | 1.13 |
| Exam. 44 | 34 | 420 | 48 | 0.08 | 105 | 16 | 810 | 1.13 |
| Exam. 36 | 34 | 420 | 52 | 0.09 | 105 | 15 | 810 | 1.13 |
| Exam. 45 | 34 | 420 | 52 | 0.08 | 105 | 15 | 810 | 1.13 |

TABLE 9

| Composition | Terpolymer (A) % | Graft polymer (B) % | Copolymer (C) % | Glass fiber (D) % | Rubber (H) parts | Intrinsic viscosity (A) | Intrinsic viscosity (C) | Styrene content difference |
|---|---|---|---|---|---|---|---|---|
| Co. Ex. 1 | A-1: 40 | B-1: 15 | C-4: 35 | 10 | 0 | 0.40 | 0.63 | 35 |
| Co. Ex. 2 | A-2: 40 | B-1: 15 | C-1: 35 | 10 | 0 | 0.40 | 0.55 | 22 |
| Exam. 2 | A-2: 40 | B-1: 15 | C-7: 35 | 10 | 0 | 0.40 | 0.58 | 2 |
| Exam. 3 | A-3: 40 | B-1: 15 | C-1: 35 | 10 | 0 | 0.40 | 0.55 | 15 |
| Exam. 46 | A-3: 40 | B-1: 15 | C-1: 35 | 10 | 3 | 0.40 | 0.55 | 15 |
| Co. Ex. 41 | A-3: 40 | B-1: 15 | C-1: 35 | 10 | 10 | 0.40 | 0.55 | 15 |
| Exam. 16 | A-3: 40 | B-2: 15 | C-1: 35 | 10 | 0 | 0.40 | 0.55 | 15 |
| Exam. 47 | A-3: 40 | B-2: 15 | C-1: 35 | 10 | 3 | 0.40 | 0.55 | 15 |
| Co. Ex. 39 | A-3: 40 | B-3: 15 | C-1: 35 | 10 | 0 | 0.40 | 0.55 | 15 |
| Exam. 48 | A-3: 40 | B-3: 15 | C-1: 35 | 10 | 3 | 0.40 | 0.55 | 15 |
| Co. Ex. 8 | A-3: 40 | B-1: 15 | C-2: 30 | 15 | 0 | 0.40 | 0.58 | 11 |
| Co. Ex. 3 | A-3: 40 | B-1: 15 | C-2: 5 | 40 | 0 | 0.40 | 0.58 | 11 |
| Co. Ex. 4 | A-3: 30 | B-1: 10 | C-3: 50 | 10 | 0 | 0.40 | 1.10 | 11 |
| Exam. 9 | A-3: 30 | B-1: 10 | C-4: 50 | 10 | 0 | 0.40 | 0.63 | 8 |
| Co. Ex. 5 | A-3: 30 | B-1: 10 | C-5: 50 | 10 | 0 | 0.40 | 0.36 | 8 |
| Co. Ex. 6 | A-4: 30 | B-1: 10 | C-4: 50 | 10 | 0 | 0.81 | 0.63 | 8 |
| Exam. 11 | A-5: 30 | B-1: 10 | C-2: 50 | 10 | 0 | 0.40 | 0.58 | 5 |
| Exam. 49 | A-5: 30 | B-1: 10 | C-2: 50 | 10 | 2 | 0.40 | 0.58 | 5 |
| Exam. 24 | A-5: 30 | B-2: 10 | C-2: 50 | 10 | 0 | 0.40 | 0.58 | 5 |
| Exam. 50 | A-5: 30 | B-2: 10 | C-2: 50 | 10 | 1.5 | 0.40 | 0.58 | 5 |

TABLE 9-continued

| Composition | Terpolymer (A) % | Graft polymer (B) % | Copolymer (C) % | Glass fiber (D) % | Rubber (H) parts | Intrinsic viscosity (A) | Intrinsic viscosity (C) | Styrene content difference |
|---|---|---|---|---|---|---|---|---|
| Exam. 35 | A-5: 30 | B-3: 10 | C-2: 50 | 10 | 0 | 0.40 | 0.58 | 5 |
| Exam. 51 | A-5: 30 | B-3: 10 | C-2: 50 | 10 | 1 | 0.40 | 0.58 | 5 |
| Co. Ex. 8 | A-6: 30 | B-1: 10 | C-2: 50 | 10 | 0 | 0.65 | 0.58 | 5 |
| Co. Ex. 10 | A-5: 20 | B-1: 8 | C-6: 60 | 12 | 0 | 0.40 | 0.58 | −6 |
| Co. Ex. 12 | A-8: 20 | B-1: 8 | C-2: 60 | 12 | 0 | 0.34 | 0.58 | 5 |
| Exam. 13 | A-7: 20 | B-1: 8 | C-1: 60 | 12 | 0 | 0.40 | 0.55 | 0 |
| Exam. 52 | A-7: 20 | B-1: 8 | C-1: 60 | 12 | 0.5 | 0.40 | 0.55 | 0 |
| Exam. 26 | A-7: 20 | B-2: 8 | C-1: 60 | 12 | 0 | 0.40 | 0.55 | 0 |
| Exam. 53 | A-7: 20 | B-2: 8 | C-1: 60 | 12 | 0.5 | 0.40 | 0.55 | 0 |
| Exam. 36 | A-7: 20 | B-3: 8 | C-1: 60 | 12 | 0 | 0.40 | 0.55 | 0 |
| Exam. 54 | A-7: 20 | B-3: 8 | C-1: 60 | 12 | 0.5 | 0.40 | 0.55 | 0 |

TABLE 10

| | Processability | | | Heat resistance | Impact resistance | Tensile strength | Specific gravity |
|---|---|---|---|---|---|---|---|
| | Melt flow index | Bar flow length | Tapping strength | | | | |
| Co. Ex. 1 | 12 | 260 | 30 | 114 | 10 | 650 | 1.17 |
| Co. Ex. 2 | 26 | 365 | 30 | 103 | 11 | 670 | 1.14 |
| Exam. 2 | 20 | 320 | 47 | 111 | 16 | 750 | 1.14 |
| Exam. 3 | 27 | 380 | 55 | 114 | 18 | 780 | 1.15 |
| Exam. 46 | 31 | 405 | 52 | 114 | 18 | 760 | 1.15 |
| Co. Ex. 41 | 34 | 430 | 30 | 112 | 10 | 700 | 1.11 |
| Exam. 16 | 27 | 380 | 45 | 114 | 18 | 780 | 1.14 |
| Exam. 47 | 31 | 405 | 42 | 114 | 18 | 760 | 1.14 |
| Co. Ex. 39 | 27 | 380 | 49 | 114 | 17 | 780 | 1.14 |
| Exam. 48 | 31 | 405 | 46 | 114 | 17 | 760 | 1.14 |
| Co. Ex. 8 | 23 | 345 | 65 | 117 | 25 | 860 | 1.19 |
| Co. Ex. 3 | 18 | 305 | >70 | 123 | 14 | 1120 | 1.36 |
| Co. Ex. 4 | 12 | 260 | 65 | 112 | 22 | 820 | 1.14 |
| Exam. 9 | 26 | 365 | 63 | 112 | 20 | 810 | 1.14 |
| Co. Ex. 5 | 32 | 410 | 32 | 112 | 16 | 640 | 1.14 |
| Co. Ex. 6 | 11 | 250 | 65 | 112 | 20 | 810 | 1.14 |
| Exam. 11 | 27 | 380 | 62 | 111 | 20 | 800 | 1.14 |
| Exam. 49 | 30 | 400 | 60 | 111 | 20 | 790 | 1.14 |
| Exam. 24 | 27 | 380 | 52 | 111 | 20 | 800 | 1.13 |
| Exam. 50 | 29 | 395 | 50 | 111 | 20 | 790 | 1.13 |
| Exam. 35 | 27 | 380 | 57 | 111 | 19 | 800 | 1.13 |
| Exam. 51 | 28 | 390 | 55 | 111 | 19 | 800 | 1.13 |
| Co. Ex. 8 | 15 | 285 | 63 | 111 | 21 | 810 | 1.14 |
| Co. Ex. 10 | 32 | 410 | 32 | 100 | 10 | 710 | 1.15 |
| Co. Ex. 12 | 39 | 455 | 52 | 96 | 14 | 820 | 1.13 |
| Exam. 13 | 34 | 420 | 58 | 105 | 16 | 810 | 1.14 |
| Exam. 52 | 35 | 425 | 57 | 105 | 16 | 810 | 1.14 |
| Exam. 26 | 34 | 420 | 48 | 105 | 16 | 810 | 1.13 |
| Exam. 53 | 35 | 425 | 47 | 105 | 16 | 810 | 1.13 |
| Exam. 36 | 34 | 420 | 52 | 105 | 15 | 810 | 1.13 |
| Exam. 54 | 35 | 425 | 51 | 105 | 15 | 810 | 1.13 |

TABLE 11

| Composition | Terpolymer (A) % | Graft polymer (B) % | Copolymer (C) % | Glass fiber (D) % | Graft polymer (I) parts | Intrinsic viscosity (A) | Intrinsic viscosity (C) | Styrene content difference |
|---|---|---|---|---|---|---|---|---|
| Co. Ex. 1 | A-1: 40 | B-1: 15 | C-4: 35 | 10 | 0 | 0.40 | 0.63 | 35 |
| Co. Ex. 2 | A-2: 40 | B-1: 15 | C-1: 35 | 10 | 0 | 0.40 | 0.55 | 22 |
| Exam. 2 | A-2: 40 | B-1: 15 | C-7: 35 | 10 | 0 | 0.40 | 0.58 | 2 |
| Exam. 3 | A-3: 40 | B-1: 15 | C-1: 35 | 10 | 0 | 0.40 | 0.55 | 15 |
| Exam. 55 | A-3: 40 | B-1: 15 | C-1: 35 | 10 | 20 | 0.40 | 0.55 | 15 |
| Co. Ex. 42 | A-3: 40 | B-1: 15 | C-1: 35 | 10 | 70 | 0.40 | 0.55 | 15 |
| Exam. 16 | A-3: 40 | B-2: 15 | C-1: 35 | 10 | 0 | 0.40 | 0.55 | 15 |
| Exam. 56 | A-3: 40 | B-2: 15 | C-1: 35 | 10 | 20 | 0.40 | 0.55 | 15 |
| Co. Ex. 8 | A-3: 40 | B-1: 15 | C-2: 30 | 15 | 0 | 0.40 | 0.58 | 11 |
| Co. Ex. 3 | A-3: 40 | B-1: 15 | C-2: 5 | 40 | 0 | 0.40 | 0.58 | 11 |
| Co. Ex. 4 | A-3: 30 | B-1: 10 | C-3: 50 | 10 | 0 | 0.40 | 1.10 | 11 |

TABLE 11-continued

| Compo-sition | Terpolymer (A) % | Graft polymer (B) % | Copolymer (C) % | Glass fiber (D) % | Graft polymer (I) parts | Intrinsic viscosity (A) | Intrinsic viscosity (C) | Styrene content difference |
|---|---|---|---|---|---|---|---|---|
| Exam. 9 | A-3: 30 | B-1: 10 | C-4: 50 | 10 | 0 | 0.40 | 0.63 | 8 |
| Co. Ex. 5 | A-3: 30 | B-1: 10 | C-5: 50 | 10 | 0 | 0.40 | 0.36 | 8 |
| Co. Ex. 6 | A-4: 30 | B-1: 10 | C-4: 50 | 10 | 0 | 0.81 | 0.63 | 8 |
| Exam. 11 | A-5: 30 | B-1: 10 | C-2: 50 | 10 | 0 | 0.40 | 0.58 | 5 |
| Exam. 57 | A-5: 30 | B-1: 10 | C-2: 50 | 10 | 15 | 0.40 | 0.58 | 5 |
| Exam. 24 | A-5: 30 | B-2: 10 | C-2: 50 | 10 | 0 | 0.40 | 0.58 | 5 |
| Exam. 58 | A-5: 30 | B-2: 10 | C-2: 50 | 10 | 30 | 0.40 | 0.58 | 5 |
| Co. Ex. 8 | A-6: 30 | B-1: 10 | C-2: 50 | 10 | 0 | 0.65 | 0.58 | 5 |
| Co. Ex. 10 | A-5: 20 | B-1: 8 | C-6: 60 | 12 | 0 | 0.40 | 0.58 | −6 |
| Co. Ex. 12 | A-8: 20 | B-1: 8 | C-2: 60 | 12 | 0 | 0.34 | 0.58 | 5 |
| Exam. 13 | A-7: 20 | B-1: 8 | C-1: 60 | 12 | 0 | 0.40 | 0.55 | 0 |
| Exam. 59 | A-7: 20 | B-1: 8 | C-1: 60 | 12 | 5 | 0.40 | 0.55 | 0 |
| Exam. 26 | A-7: 20 | B-2: 8 | C-1: 60 | 12 | 0 | 0.40 | 0.55 | 0 |
| Exam. 60 | A-7: 20 | B-2: 8 | C-1: 60 | 12 | 5 | 0.40 | 0.55 | 0 |

TABLE 12

| | Processability | | | | Heat resis-tance | Impact resis-tance | Tensile strength | Specific gravity |
|---|---|---|---|---|---|---|---|---|
| | Melt flow index | Bar flow length | Tapping strength | Appea-rance | | | | |
| Co. Ex. 1 | 12 | 260 | 30 | 4.3 | 114 | 10 | 650 | 1.17 |
| Co. Ex. 2 | 26 | 365 | 30 | 4.0 | 103 | 11 | 670 | 1.14 |
| Exam. 2 | 20 | 320 | 47 | 4.0 | 111 | 16 | 750 | 1.14 |
| Exam. 3 | 27 | 380 | 55 | 3.8 | 114 | 18 | 780 | 1.15 |
| Exam. 55 | 35 | 400 | 55 | 0.4 | 113 | 20 | 760 | 1.13 |
| Co. Ex. 42 | 21 | 360 | 42 | 0.6 | 109 | 22 | 700 | 1.11 |
| Exam. 16 | 27 | 380 | 45 | 3.3 | 114 | 18 | 780 | 1.14 |
| Exam. 56 | 35 | 400 | 45 | 0.3 | 113 | 20 | 760 | 1.12 |
| Co. Ex. 8 | 23 | 345 | 65 | 5.8 | 117 | 25 | 860 | 1.19 |
| Co. Ex. 3 | 18 | 305 | >70 | 7:1 | 123 | 14 | 1120 | 1.36 |
| Co. Ex. 4 | 12 | 260 | 65 | 4.6 | 112 | 22 | 820 | 1.14 |
| Exam. 9 | 26 | 365 | 63 | 3.5 | 112 | 20 | 810 | 1.14 |
| Co. Ex. 5 | 32 | 410 | 32 | 3.3 | 112 | 16 | 640 | 1.14 |
| Co. Ex. 6 | 11 | 250 | 65 | 4.7 | 112 | 20 | 810 | 1.14 |
| Exam. 11 | 27 | 380 | 62 | 3.6 | 111 | 20 | 800 | 1.14 |
| Exam. 57 | 30 | 390 | 62 | 0.5 | 110 | 21 | 780 | 1.13 |
| Exam. 24 | 27 | 380 | 52 | 3.4 | 111 | 20 | 800 | 1.13 |
| Exam. 58 | 30 | 390 | 61 | 0.4 | 110 | 21 | 780 | 1.12 |
| Co. Ex. 8 | 15 | 285 | 63 | 4.3 | 111 | 21 | 810 | 1.14 |
| Co. Ex. 10 | 32 | 410 | 32 | 3.8 | 100 | 10 | 710 | 1.15 |
| Co. Ex. 12 | 39 | 455 | 52 | 3.5 | 96 | 14 | 820 | 1.13 |
| Exam. 13 | 34 | 420 | 58 | 3.7 | 105 | 16 | 810 | 1.14 |
| Exam. 59 | 35 | 430 | 58 | 1.0 | 105 | 17 | 800 | 1.14 |
| Exam. 26 | 34 | 420 | 48 | 3.5 | 105 | 16 | 810 | 1.13 |
| Exam. 60 | 34 | 430 | 48 | 0.9 | 105 | 17 | 800 | 1.13 |

What is claimed is:

1. A glass fiber-reinforced thermoplastic resin composition comprising:
  (A) 10 to 60% by weight of a terpolymer which comprises 10 to 30% by weight of N-phenylmaleimide, 45 to 85% by weight of styrene and 5 to 25% by weight of acrylonitrile,
  (B) 5 to 15% by weight of a graft polymer which consists essentially of 20 to 70% by weight of at least one rubber selected from the group consisting of a conjugated diene rubber, an ethylene-propylene rubber and an ethylene-butylene rubber comprising 70 to 95% by weight of ethylene and 5 to 30% by weight of butylene, to which rubber 25 to 60% by weight of styrene and 5 to 40% by weight of acrylonitrile are graft polymerized,
  (C) 10 to 80% by weight of a copolymer which comprises 50 to 80% by weight of styrene and 20 to 50% by weight of acrylonitrile, and (D) 5 to 35% by weight of glass fiber, wherein:
  (a) said terpolymer has an intrinsic viscosity of 0.20 dl/g to 0.70 dl/g,
  (b) said copolymer has an intrinsic viscosity of 0.40 dl/g to 1.00 dl/g,
  (c) the intrinsic viscosity of the terpolymer is equal to or smaller than that of the copolymer, and
  (d) a difference of a styrene content in the copolymer and that in the terpolymer (a styrene content in the copolymer−(minus) a styrene content in the terpolymer) is from +20 to −5% by weight.

2. A glass fiber-reinforced thermoplastic resin composition comprising 100 parts by weight of the composition of claim 1 and 0.01 to 10 parts by weight of an organic silicon compound (E).

3. A glass fiber-reinforced thermoplastic resin composition comprising 100 parts by weight of the composition of claim 1 and 0.01 to 30 parts by weight of an acid-modified copolymer (F) which comprises 2 to 20% by weight of an unsaturated carboxylic acid, 30 to 93% by weight of styrene and 5 to 50% by weight of acrylonitrile.

4. A glass fiber-reinforced thermoplastic resin composition comprising 100 parts by weight of the composition of claim 1 and 0.05 to 5 parts by weight of an ethylene-butylene rubber (G) which comprises 70 to 95% by weight of ethylene and 5 to 30% by weight of butylene.

5. A glass fiber-reinforced thermoplastic resin composition comprising 100 parts by weight of the composition of claim 1 and 0.05 to 5 parts by weight of a hydrogenated styrene butadiene block rubber (H).

6. A glass fiber-reinforced thermoplastic resin composition comprising 100 parts by weight of the composition of claim 1 and 5 to 50 parts by weight of a graft polymer which comprises 20 to 70% by weight of an ethylene-olefin rubber comprising 70 to 95% by weight of ethylene and 5 to 30% by weight of an olefin having 4 to 8 carbon atoms, to which rubber, 25 to 60% by weight of styrene and 5 to 40% by weight of acrylonitrile are grafted.

7. A glass fiber-reinforced thermoplastic resin composition as recited in claim 1 wherein the graft polymer of (B) is present in an amount of 8 to 15% by weight.

8. A glass fiber-reinforced thermoplastic resin composition as recited in claim 1, wherein the terpolymer of (A) comprises by weight 20 to 30% N-phenylmaleimide, 60–70% styrene and 10–20% acrylonitrile.

9. A glass fiber-reinforced thermoplastic resin composition as recited in claim 1 wherein the graft polymer of (B) consists essentially of 20 to 60% by weight of the rubber, to which rubber 30 to 60% by weight of styrene and 10 to 30% by weight of acrylonitrile are graft polymerized.

10. A glass fiber-reinforced thermoplastic resin composition as recited in claim 9 wherein the rubber is butadiene homopolymer rubber.

11. A glass fiber-reinforced thermoplastic resin composition as recited in claim 10 wherein the graft polymer of (B) consists essentially of 40 to 60% by weight of butadiene homopolymer, to which rubber 30 to 40% styrene and 10 to 20% acrylonitrile are graft polymerized.

12. A glass fiber-reinforced thermoplastic resin composition as recited in claim 9 wherein the rubber is ethylene-propylene-ethylidenenorbornene rubber.

13. A glass fiber-reinforced thermoplastic resin composition as recited in claim 12 wherein the graft polymer of (B) consists essentially of 20 to 30% by weight of ethylene-propylene-ethylidenenorbornene rubber, to which rubber 45 to 60% by weight of styrene and 20 to 30% by weight acrylonitrile are graft polymerized.

14. A glass fiber-reinforced thermoplastic resin composition as recited in claim 9 wherein the rubber is ethylenebutylene rubber comprising 70 to 95% by weight of ethylene and 5 to 30% by weight of butylene.

15. A glass fiber-reinforced thermoplastic resin composition as recited in claim 14 wherein the graft polymer of (B) consists essentially of 20 to 30% by weight of the ethylenebutylene rubber, to which rubber 45 to 60% by weight of styrene and 15 to 25% of acrylonitrile are graft polymerized.

* * * * *

UNITED STATES PATENT AND TRADEMARK OFFICE
CERTIFICATE OF CORRECTION

PATENT NO. : 5,811,491
DATED : September 22, 1998
INVENTOR(S) : Yasutoshi Jagawa, et al.

It is certified that error appears in the above-identified patent and that said Letters Patent is hereby corrected as shown below:

On the title page in [63], after "abandoned", insert --which is a 371 of PCT/JP93/00392, filed on March 30, 1993--.

Claim 14 (column 26, lines 21-22), change "ethylenebutylene" to --ethylene-butylene--.

Claim 15 (column 26, lines 26-27), change "ethylenebutylene" to --ethylene-butylene--.

Signed and Sealed this

Second Day of February, 1999

Attest:

Attesting Officer

*Acting Commissioner of Patents and Trademarks*